(12) United States Patent
La Frese et al.

(10) Patent No.: US 8,874,854 B2
(45) Date of Patent: Oct. 28, 2014

(54) METHOD FOR SELECTIVELY ENABLING AND DISABLING READ CACHING IN A STORAGE SUBSYSTEM

(75) Inventors: Lee Charles La Frese, Tucson, AZ (US); Joshua Douglas Martin, Tucson, AZ (US); Justin Thomson Miller, Tucson, AZ (US); Vernon Walter Miller, Tucson, AZ (US); James Russell Thompson, Tucson, AZ (US); Yan Xu, Tucson, AZ (US); Olga Yiparaki, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 11/830,124

(22) Filed: Jul. 30, 2007

(65) Prior Publication Data

US 2009/0037662 A1 Feb. 5, 2009

(51) Int. Cl.
*G06F 12/00* (2006.01)
*G06F 12/08* (2006.01)

(52) U.S. Cl.
CPC ................................. *G06F 12/0888* (2013.01)
USPC ........................... 711/138; 711/152; 711/173

(58) Field of Classification Search
USPC .................................. 711/118, 138, 152, 170
See application file for complete search history.

(56) References Cited

U.S. PATENT DOCUMENTS

| 5,499,354 A | * | 3/1996 | Aschoff et al. | ............... 711/129 |
| 5,696,932 A | * | 12/1997 | Smith | ........................ 711/118 |
| 6,687,765 B2 | * | 2/2004 | Surugucchi et al. | ............ 710/15 |
| 6,978,349 B1 | * | 12/2005 | Wilkes | ........................ 711/118 |
| 2005/0076179 A1 | | 4/2005 | Schopp | ........................ 711/119 |
| 2005/0149481 A1 | | 7/2005 | Hesselink et al. | ................ 707/1 |
| 2006/0026229 A1 | | 2/2006 | Ari et al. | ........................ 709/203 |

* cited by examiner

*Primary Examiner* — Kalpit Parikh
(74) *Attorney, Agent, or Firm* — Terrile, Cannatti, Chambers & Holland, LLP; Stephen A. Terrile

(57) ABSTRACT

A mechanism for selectively disabling and enabling read caching based on past performance of the cache and current read/write requests. The system improves overall performance by using an autonomic algorithm to disable read caching for regions of backend disk storage (i.e., the backstore) that have had historically low cache hit ratios. The result is that more cache becomes available for workloads with larger hit ratios, and less time and machine cycles are spent searching the cache for data that is unlikely to be there.

15 Claims, 6 Drawing Sheets

METHOD FOR SELECTIVELY ENABLING AND DISABLING READ CACHING IN A STORAGE SUBSYSTEM

BACKGROUND OF THE INVENTION

1. Field of the Invention

The present invention relates in general to the field of computers and similar technologies, and in particular to software utilized in this field. Still more particularly, the present invention relates to selectively enabling and disabling read caching in storage subsystems.

2. Description of the Related Art

Effective cache management is important to the performance of modern disk storage subsystems, because Input/Output (I/O) latency can increase by orders magnitude if requested data must be read from a physical disk. For this reason algorithms have been developed to on one hand demote stale data from cache (e.g. the Least Recently Used (LRU) replacement algorithm, the adaptive replacement cache (ARC) replacement algorithm) as quickly as possible, and on the other to predict and prestage data (e.g. sequential detection) that could possibly be requested soon.

Known cache management schemes reduce I/O latency and increase throughput for disk workloads that largely request data before the data can be demoted from the cache, i.e. request the same data records repeatedly. However these schemes do not necessarily improve performance for workloads that have a highly random access pattern. For these cache miss type workloads, time and machine cycles are spent searching the cache for the data before finally retrieving the data from a physical disk. The data is then placed in the cache, effectively wasting cache space since there is a very low probability of requesting the data again before the data ages out of the cache. Thus, memory resources and processor time may be wasted in processing random access reads.

One known cache management scheme that attempts to address this issue is a host based method such as the System Managed Storage (SMS) tool available on an S/390 Storage System from International Business Machines Corporation. The SMS tool uses Dynamic Cache Management Enhanced (DCME) that could disable caching on a dataset basis. This tool is often not used by newer hardware which can ignore software hints to turn off caching.

Accordingly, it would be desirable to provide a caching algorithm which does not rely on host software to manage caching and can be effectively used for disk storage systems that support multiple concurrent operating systems.

SUMMARY OF THE INVENTION

In accordance with the present invention, a mechanism for disabling and enabling read caching based on past performance of the cache and current read/write requests is set forth. The system improves overall performance by using an autonomic algorithm to disable read caching for regions of backend disk storage (i.e., the backstore) that have had historically low cache hit ratios. The result is that more cache becomes available for workloads with larger hit ratios, and less time and machine cycles are spent searching the cache for data that is unlikely to be there.

More specifically, the system uses a Selective Read Caching (SRC) algorithm to selectively enable and disable read caching for individual regions of the backstore depending on whether or not read caching has provided any recent benefit. Disabling read caching for a region of the backstore that does not need caching decreases cache pollution, frees up cache space for regions that can make better use of caching, and reduces load on the CPU by shortening the path-length for a read miss. Additionally, by using the SRC algorithm, the aggregate performance of the storage system may be improved.

In certain embodiments, the SRC module divides the backstore into logical backstore units (LBUs). A read hit ratio is recorded for each LBU while the read cache is enabled. When the read hit ratio of an LBU is below a predefined threshold, the read cache is disabled for that LBU. While the read cache is disabled, the distribution of read access to the LBU is recorded over short time intervals, and read caching is enabled when one portion of the LBU has significantly more read accesses than other LBUs. Additionally, read caching is enabled automatically over a longer time interval, regardless of read access distribution. When read caching is disabled for an LBU, the system allows determining that a read request cannot be satisfied from the write cache, without searching the write cache.

In one embodiment, the invention relates to a computer-implementable method for disabling and enabling read caching based on past performance of a cache request which includes performing a selective read caching function. The selective read caching function selectively enables and disables read caching for individual regions of a backstore depending on whether or not read caching has provided any recent benefit.

In another embodiment, the invention relates to a system which includes a processor, a cache coupled to the processor, a backstore coupled to the cache and the processor, and a computer-usable medium embodying computer program code. The computer program code comprises instructions executable by the processor and configured for performing a selective read caching function which enables and disables read caching for individual regions of the backstore depending on whether or not read caching has provided any recent benefit.

In another embodiment, the invention relates to a computer-usable medium embodying computer program code. The computer program code includes computer executable instructions configured for performing a selective read caching function to selectively enable and disable read caching for individual regions of a backstore depending on whether or not read caching has provided any recent benefit.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 5 shows the process for determining when to turn read caching back on.

DETAILED DESCRIPTION

Figure 1:
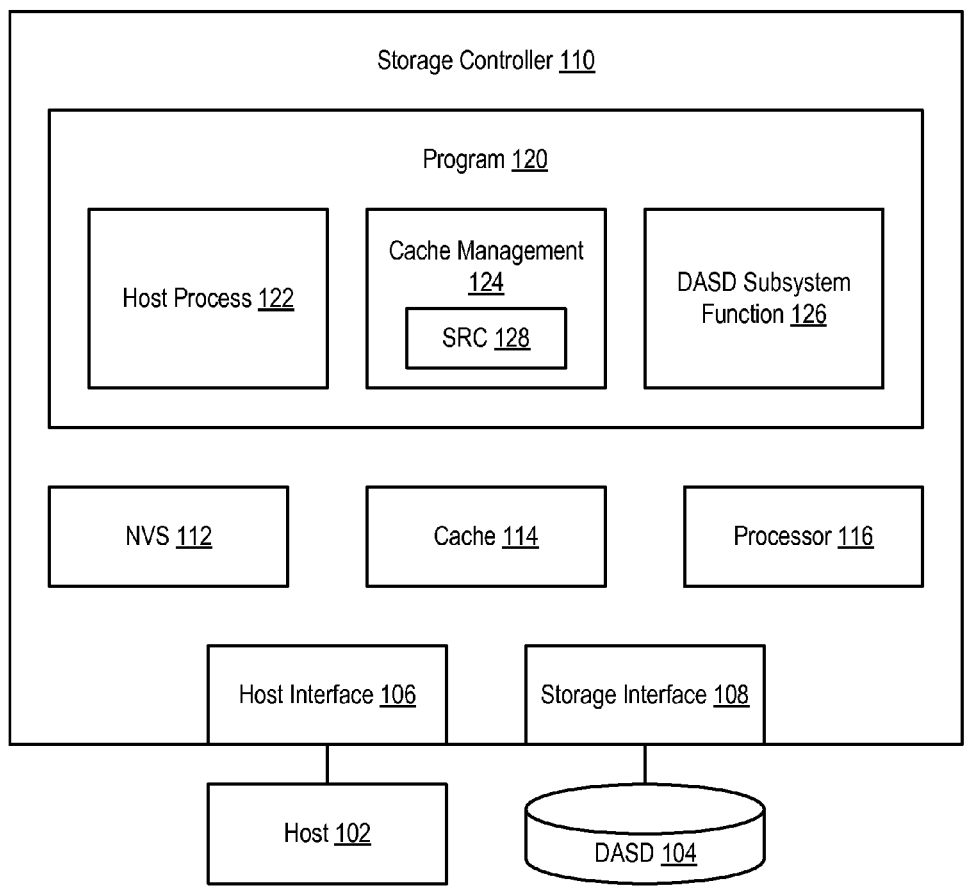
FIG. 1 shows a block diagram of a computing environment in which embodiments of the present invention may be implemented.

FIG. 1 illustrates a hardware and software environment in a storage system 100 in which the present invention may be implemented. At least one host 102 is in data communication with storage device, such as a DASD 104, via a host interface 106 and a storage interface 108 in a storage controller 110. The host 102 may be any host system known in the art, such as a mainframe computer, workstation, etc., running under an operating system such as WINDOWS®, AIX®, UNIX®, MVS™, etc. The storage controller 110, host system(s) 102, and DASD 104 may communicate via any network or communication system known in the art, such as LAN, TCP/IP, ESCON®, SAN, SNA, Fibre Channel, SCSI, etc. The DASD 104 may be one or more storage subsystems of hard disk drives, automated storage libraries, optical disks, or any suitable large, non-volatile storage medium known in the art. The storage controller 110 may be any storage controller 110 known in the art, including the IBM 3990 Storage Controller or Enterprise Storage Server® (ESS). AIX, ESCON and Enterprise Storage Server are registered trademarks of International Business Machines Corporation ("IBM®"); MVS is a trademark of IBM; WINDOWS is a registered trademark of Microsoft Corporation; and UNIX is a registered trademark licensed by the XJOpen Company Ltd.

The storage controller 110 includes one or more processing units 116 which may execute a program 120 comprised of a host process 122, a metadata manager function 124, and a DASD subsystem function 126. Further included are a cache 114 and a non-volatile storage (NVS) 112. The NVS unit 112 may be a battery backed-up RAM. The host process 122, cache management 124, and DASD subsystem functions 126 may be separate programs or functional parts of one or more programs 120 and may be implemented as firmware in ROM or software logic within an operating system and/or application program within the storage controller 110. The host process 122 is the component of the program 120 that manages communication with the host 102 and the DASD subsystem function 126 manages communication with the DASD 104. The host process 122 executes in the storage controller 110 and manages data requests for customer data from the host 102. The host process 122 also generates a request for metadata when processing the host 102 access request for customer data. The cache management function 124 manages communication between the host process 122 and DASD subsystem function 126 components and performs many of the cache management operations.

The Selective Read Caching (SRC) module 128 addresses a plurality of cache management issues. More specifically, the SRC module 128 determines when to turn read caching off, how to sufficiently determine that a read request is not in the write cache without searching it, and how to recognize when to turn on read caching. In operation, the backstore (i.e., storage within the DASD 104) is divided into subunits of the total storage, referred to as logical backstore units (LBUs). The SRC module 128 selectively turns read caching on or off to each LBU separately.

One consideration on the size of an LBU is that it be a multiple of the cache track size. For example, the smallest piece of data capable of being allocated and managed by the cache 114 is referred to as a track. In certain embodiments, the track is a multiple of a standard disk drive sector size of 512 bytes.

The backstore is logically divided into tracks as well, so that requests for certain bytes in the backstore are translated into requests for the tracks containing the requested bytes. The sets of tracks in cache 114 that have modified data that may not be consistent with the corresponding data in the backstore, and the cache subsystem managing these tracks (within cache management 124), are referred to as the write cache (WC). The set of tracks staged into the cache 114, from the backstore, on a read miss, and the cache subsystem managing these tracks (within cache management 124), is referred to as the read cache (RC).

Figure 2:
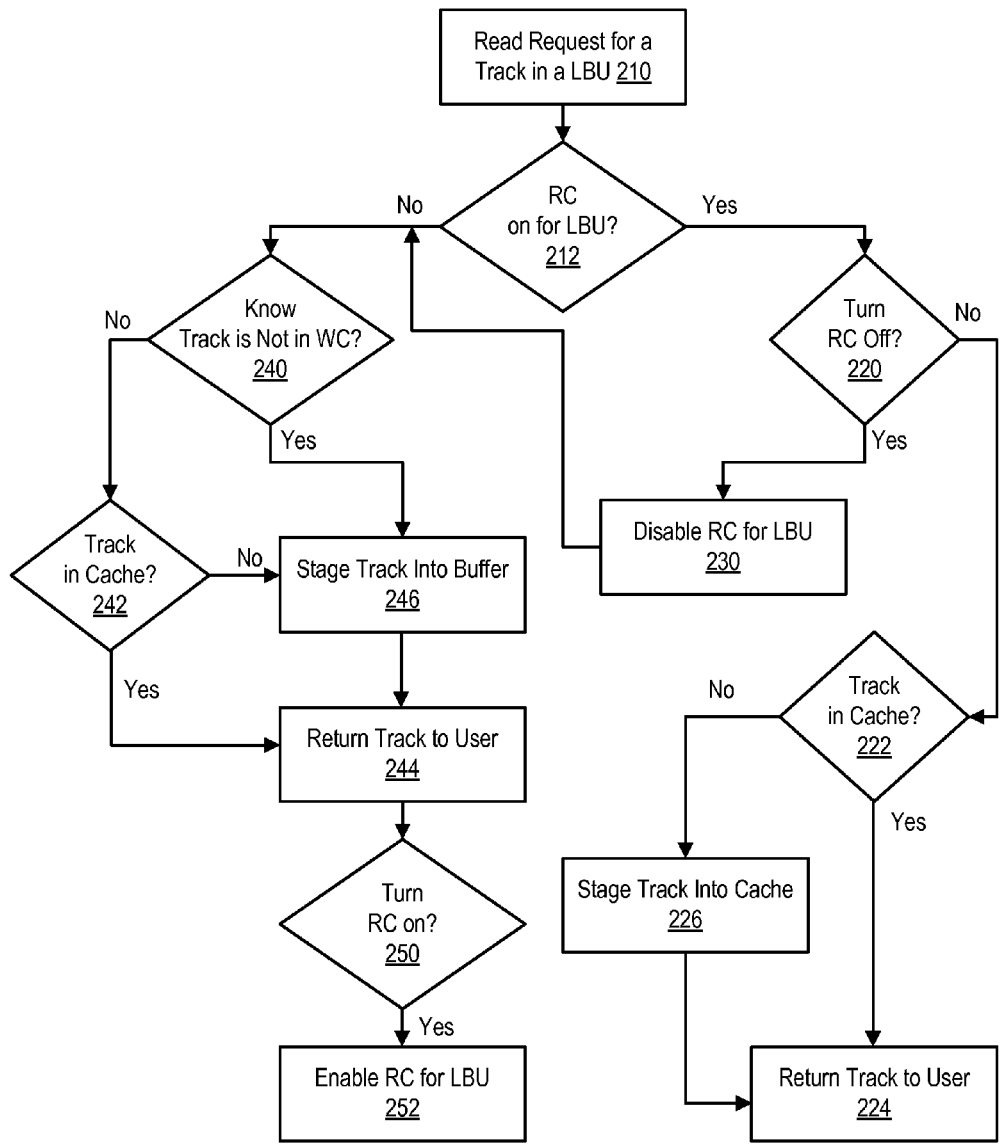
FIG. 2 shows a flow chart of the operation of a cache management system in accordance with the present invention.

Referring to FIG. 2, a flow chart of the operation of a cache management system is shown. More specifically, the flow chart shows the operation of the SRC module 128, which is initiated by a read request for a track at step 210. Next the SRC module determines whether read caching is enabled or disable at step 212 for the LBU in which the requested track resides.

If read caching is enabled for the LBU, and counters indicate that read caching should remain on for the LBU as determined by step 220, then the SRC module 128 processes the request as a store and forward cache operation. In a store and forward cache operation, if the track is already in cache as determined by step 222 then the track is immediately returned to the user at step 224; otherwise, the track is first staged into the cache 114 at step 226 and then returned to the user at step 224. If read caching is enabled for the LBU 140 when the read request comes in, but the algorithm determines that it should be disabled at step 220, then read caching is disabled for the LBU at step 230, and the request is then treated as if read caching were initially disabled.

When read caching is disabled for an LBU as determined at step 212, then the SRC module works to provide the track from the backstore to the user as quickly as possible, avoiding as much of the normal cache processing as possible. Based on the criteria used to determine if read caching should be disabled, it is unlikely that the requested track exists in the read cache; however, the track could exist in write cache, in which case the corresponding track in the backstore may be stale. Therefore, the SRC module 128 ensures that the requested track is not in the write cache at step 240 before staging the track from the backstore.

In general, a necessary and sufficient test to see if the track is in the write cache would not be any faster than checking to determine whether the track is in cache as determined at step 222, so the SRC module 128 uses a test that sufficiently checks that the track is not in the write cache at step 240. That is, when the SRC module 128 performs the test and obtains a positive (i.e., true) value, then the track must not be in the write cache. When the SRC performs the test and obtains a negative (i.e., false) value, then the track may or may not be in the write cache. If the sufficiency test has a negative value as determined at step 240, then the write cache must be searched to determine whether the track is in the write cache at step 242. In some cache implementations, the read cache and write cache cannot be searched separately, so in that case, the entire cache is searched, as in step 222; otherwise, the SRC module searches through the write cache, as the SRC module 128 has already determined that a read hit is unlikely. If the track is found in cache at step 242, whichever was searched, the track is returned to the user at step 244.

If the sufficiency test 240 has a positive result, or if the sufficiency test 240 has a negative result but the track is not found in cache at step 242, then the track is staged from the backstore into a buffer at step 246, and the track is returned to the user at step 244. The buffer is not a part of cache, but is a pre-allocated piece of storage or memory into which a track is staged. The track remains within the buffer until the track is transferred to the requester. Once the track has been returned to the user, the space occupied by the track in the buffer is available for other track stages. This buffer is part of a store and forward cache architecture, because data is not allowed to be transferred from the backstore directly to the user.

Once the track has been returned to the user at step 244, the SRC module determines whether read caching should be enabled on the LBU at step 250. The SRC module turns read caching back on for the LBU when the frequency and distribution of read requests to the LBU, during a given time interval, suggest that performance would improve due to the presence of read hits if read caching were enabled. If the analysis 250 suggests that read caching should be enabled, then read caching is enabled for the LBU at step 252.

Figure 3:
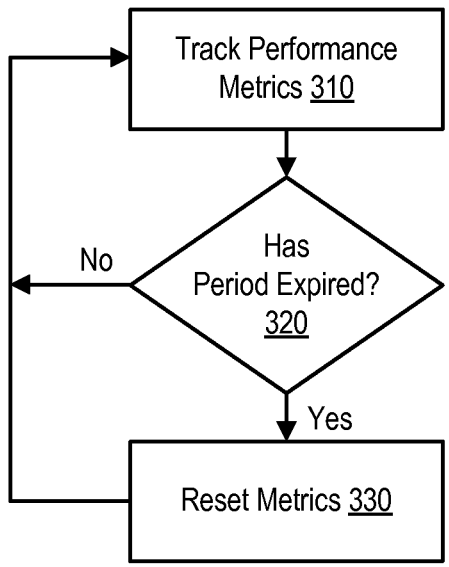
FIG. 3 shows the operation of the determination of whether to disable or enable read caching for an LBU.

Referring to FIG. 3, the operation of the determination of whether to disable or enable read caching for an LBU (e.g., step 220) is shown. More specifically, the determination of whether to disable or enable read caching for an LBU is based on a plurality of cache performance metrics including read miss ratio, latency of a read hit, latency of a read miss, IO rate, and read distribution. Some or all of these metrics are tracked with performance counters at step 310. Because workloads vary over time, these counters are reset periodically. More specifically, the SRC module 128 determines whether a time period has expired at step 320. If the time period has not expired, then the SRC module 128 continues to track the cache performance metrics at step 310. If the time period has expired, then the SRC module 128 resets the metrics at step 330 and resumes tracking the performance metrics at step 310.

In certain embodiments, the period over which the cache performance metric counters are reset is related to a cache residency time; however, for determining when to disable read caching this period could be a different amount of time. Cache residency time is a measure of the average time a record exists in cache. The longer this average time is the more efficiently cache is being used. More specifically, the cache residency time can be estimated as follows:

$$\frac{c}{r*s\left(\text{ceiling}\left(\frac{x}{s}\right)+n\right)}$$

where, r represents a read cache miss input/output operation rate for all participating cache;

x represents an average transfer size;

c represents a total cache size available for caching;

s represents a cache segment size;

n represents a number of segments used for cache structures; and,

In certain embodiments, the criterion to turn read caching off for an LBU (e.g., step 220) is based on the read hit ratio for that LBU. With read caching on, the read hit ratio is monitored and reset periodically. If the read hit ratio for a subunit falls below a predetermined threshold, then it becomes more advantageous to turn caching off and such desirability is so indicated. The threshold may either be a set value or the value could vary based on the cache residency time or a variety of other factors. A variable threshold allows a higher threshold when there is a lower cache residency time and a lower threshold when there is a higher cache residency time. The advantage of a variable threshold is that it dynamically adjusts to varying workload conditions. The actual values of the thresholds and the notions of low and high cache residency times depend on the particular cache system in which SRC is implemented.

If the read hit ratio falls below the predetermined threshold within a prescribed period of time, then read caching is disabled for the LBU. For each LBU there is some way of indicating that read caching is enabled or disabled for the LBU, such as a variable whose value is 0 or 1. Disabling the read cache at step 220 or enabling the read caching at step 252 for an LBU entails setting this variable to the appropriate value.

Figure 4A:
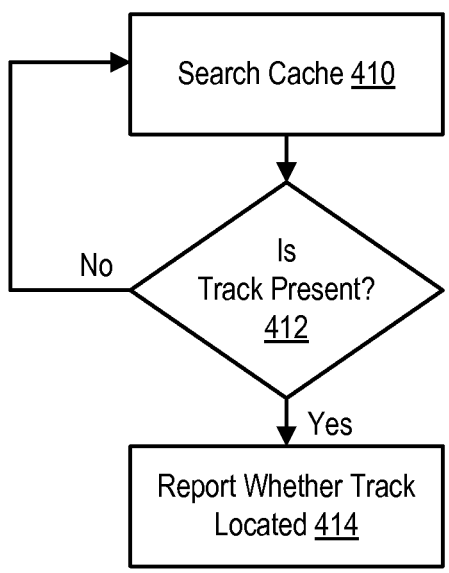
FIGS. 4A, 4B and 4C, generally referred to as FIG. 4, show methods for determining if a track is within a write cache.
Figure 4B:
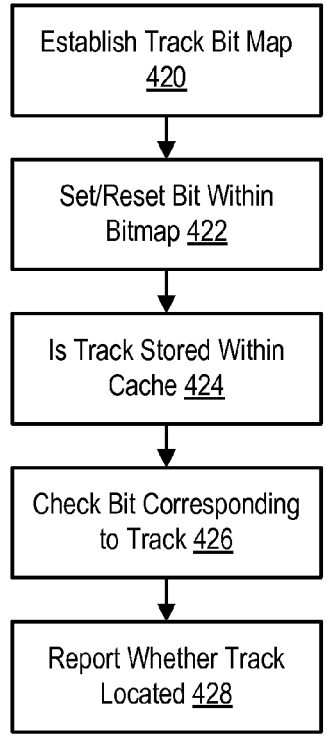
Figure 4C:
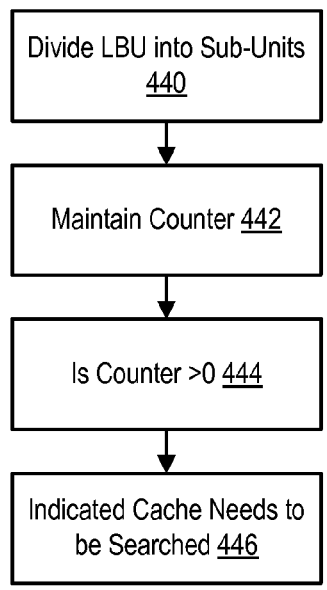

Referring to FIGS. 4A-4C, flow chart of the operation of a method for sufficiently determining if a track is within a write cache are shown. More specifically, if read caching is disabled for an LBU, then there is a method for sufficiently determining if a track is not in the write cache (e.g., step 240).

Referring to FIG. 4A, in one method, the SRC module searches through the cache and the write cache at step 410 to determine whether the track is present in the cache at step 412 (e.g., see steps 222, 242). If the track is located, then the result of the search is reported at step 414. This method does not require any extra data structures or logic, but eliminates the benefits that can be gained by an effective sufficient condition if the search routine is not extremely fast.

Referring to FIG. 4B, in another method, the SRC module 128 maintains a track bitmap at step 420, with one bit for every track in the backstore. When a track is placed in the write cache then the bit is set to 1, and when a track is evicted from the write cache at step 422, then the bit is set to 0. The SRC module 128 can determine whether a track is stored within the write cache at step 424, by checking the bit corresponding to the track within the bitmap at step 426. If the bit is set within the bitmap, then the track is reported as located at step 428 This method has the advantage of being easy to check and also being a necessary condition for a track to be in the write cache (thus, obviating the need to perform step 242). However, for many track and backstore sizes, the memory requirements for maintaining such a bitmap may be prohibitive. For example, if the track size is 64 KB then the track bitmap would require 2 MB of memory per 1 TB of backstore.

Referring to FIG. 4C, another method for sufficiently determining if a track is within a write cache is shown. This method presents a compromise between the necessary and sufficient methods of FIGS. 4A and 4B. More specifically, in this method, each LBU is divided into n subunits at step 440, with each subunit representing (1/n)th of the tracks in the LBU. The SRC module 128 then maintains a counter for each subunit at step 442 where the counter represents the number of tracks from that subunit in the write cache. For example, each time a track from the region represented by the subunit is added to the write cache, the SRC module increments the counter; and likewise, when the track is evicted from the write cache, the SRC module decrements the counter. The method then determines whether the counter for a subunit is zero at step 444. If the counter is not zero, then a cache/write cache search (e.g., step 242) will have to be performed to determine whether the track is located within the write cache at step 446. With this method, little overhead is added by keeping track of and checking the subunits' counters. This method is effective in eliminating some cache searches when there are some subunits of an LBU that do not have frequent write requests.

Figure 5:
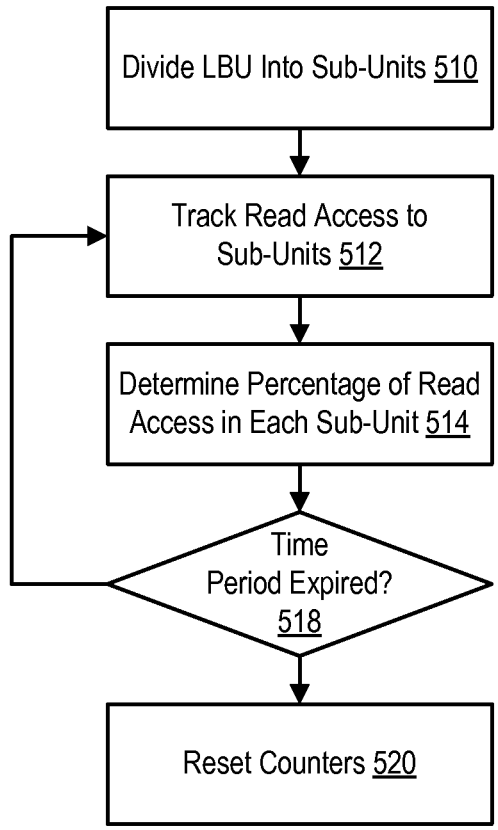

Referring to FIG. 5, the process for determining when to turn read caching back on (e.g., step 250) is shown. Because a read cache hit occupies a fraction of the time to complete compared with a read miss, it is important to be able to turn read caching back on quickly when the access pattern has changed to include repeated references to tracks. Also, sequential prefetching cannot be performed without a read cache, so read caching needs to be enabled when the access pattern includes sequentially accessed tracks.

If within a short period of time, (e.g., within the cache residency time), enough accesses come in for a single track or set of tracks to warrant enabling read caching, one small portion of the LBU will likely have many more accesses to it than the other portions of the LBU. Likewise, if a set of tracks are accessed sequentially within a short period of time, the small portion of the LBU containing those tracks will likely have many more accesses to it than the other portions.

Accordingly, in certain embodiments, the SRC module 128 determines when to turn read caching by dividing the LBU into n subunits of contiguous logical block address (LBA) space at step 510. Next, over some small period of time, the SRC module 128 tracks how many read accesses occur in each subunit at step 512. If one of the subunits contains more than a certain percentage (which percentage may be statically or dynamically determined) of all read accesses to the LBU as determined by step 514, then read caching is enabled for that LBU at step 516. Next, the SRC module 128 determines whether a given short period of time (e.g., the cache residency time) has expired at step 518. If the time period has not expired, then the SRC module 128 continues to track the read access. If the time period has expired, then the SRC module 128 resets the counters for the subunits at step 520. The values for the number of subunits and given percentage are determined empirically (e.g., during the development of the cache subsystem). These values can vary depending on the cache subsystem and expected accesses patterns.

There is a small possibility that all subunits could have about the same number of read accesses, but enabling read caching on the LBU would still be beneficial. To cover this condition, read caching can be enabled periodically regardless of how read accesses are distributed across the LBU. The time period for turning on read caching in this situation is a large multiple (e.g., >10× the time of the short time period) of the short time period used to count read accesses to the LBU subunits to prevent cache pollution. A good value for this time period can also be determined empirically.

Figure 6:
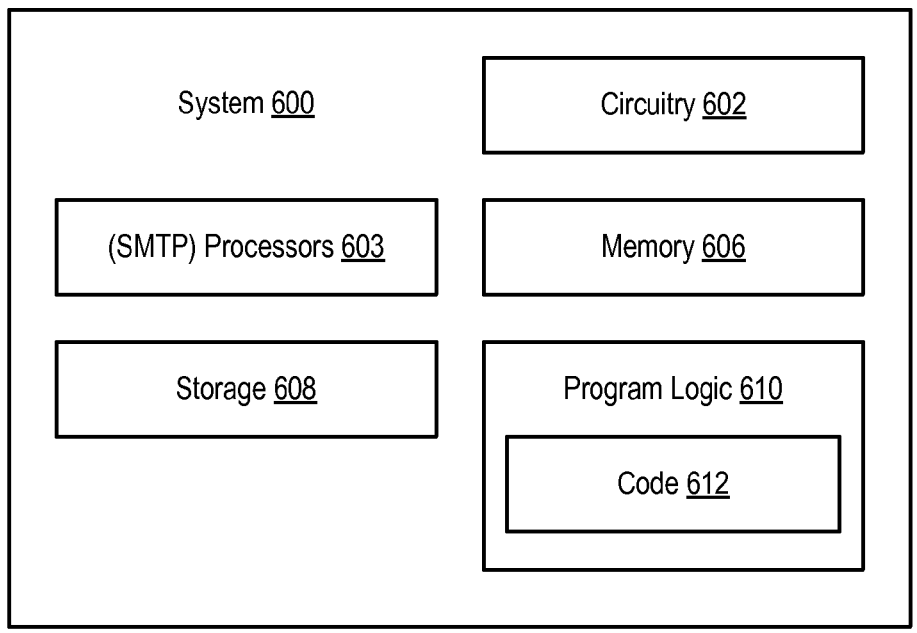
FIG. 6 shows a block diagram of a system in which certain embodiments of the invention are implemented.

FIG. 6 illustrates a block diagram of a system 600 in which certain embodiments may be implemented. In certain embodiments, the storage control unit 102 and the hosts 104a . . . 104n may be implemented in accordance with the system 600. The system 600 may include a circuitry 602 that may in certain embodiments include a processor 604. The system 600 may also include a memory 606 (e.g., a volatile memory device), and storage 608. Certain elements of the system 600 may or may not be found in the storage control unit 102 or the hosts 104a . . . 104n. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

As used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDAs), telephones, and any other system capable of processing, transmitting, receiving, capturing and/or storing data.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, some of the many possible ways of determining size include setting sizes based on a certain number of tracks, a certain size in megabytes, or logical volume sizes). In fact, different LBUs could have different sizes.

Also, for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for disabling and enabling read caching based on past performance of a cache requests comprising:
    performing a selective read caching function, the selective read caching function selectively enabling and disabling read caching for individual regions of a backstore depending on whether read caching has provided any recent benefit; and wherein
    while read caching is disabled, a distribution of read accesses to a logical backstore unit (LBU) is recorded over short time intervals, the short time intervals corresponding to a cache residency time value, the cache residency time value comprising a total cache size available for caching divided by a value comprising a read cache miss input/output operation rate for all participating cache multiplied by a ceiling value determined based upon at least an average transfer size, a cache segment size and a number of segments used for cache structures; and, read caching is enabled when one portion of the LBU has more read accesses than other LBUs.

2. The computer implementable method of claim 1, wherein the selective read caching function further comprises:

dividing the backstore into a plurality of logical backstore units (LBUs), one of the plurality of logical backstore units comprising the logical backstore unit; and, selectively enabling and disabling read caching for each of the plurality of LBUs.

3. The computer implementable method of claim 2, wherein:

a read hit ratio is recorded for each of the plurality of LBUs while a read cache is enabled; and, when the read hit ratio of each of the plurality of LBUs is below a predefined threshold, the read cache is disabled for each LBU for which the read hit ratio is below the predefined threshold.

4. The computer implementable method of claim 3, wherein:

read caching is enabled automatically over a longer time interval, regardless of read access distribution.

5. The computer implementable method of claim 3, wherein:

when read caching is disabled for at least one LBU of the plurality of LBUs, determining that a read request cannot be satisfied from the write cache, without searching the write cache.

6. A system comprising:

a processor;

a cache coupled to the processor;

a backstore coupled to the cache and the processor; and a computer-usable medium embodying computer program code, the computer program code comprising instructions executable by the processor and configured for:

performing a selective read caching function, the selective read caching function selectively enabling and disabling read caching for individual regions of the backstore depending on whether read caching has provided any recent benefit; and wherein while read caching is disabled, a distribution of read accesses to a logical backstore unit (LBU) is recorded over short time intervals, the short time intervals corresponding to a cache residency time value, the cache residency time value comprising a total cache size available for caching divided by a value comprising a read cache miss input/output operation rate for all participating cache multiplied by a ceiling value determined based upon at least an average transfer size, a cache segment size and a number of segments used for cache structures; and, read caching is enabled when one portion of the LBU has more read accesses than other LBUs.

7. The system of claim 6, wherein the computer program code further comprises instructions executable by the processor and configured for:

dividing the backstore into a plurality of logical backstore units (LBUs)), one of the plurality of logical backstore units comprising the logical backstore unit; and, selectively enabling and disabling read caching for each of the plurality of LBUs.

8. The system of claim 7, wherein:

a read hit ratio is recorded for each of the plurality of LBUs while a read cache is enabled; and, when the read hit ratio of each of the plurality of LBUs is below a predefined threshold, the read cache is disabled for each LBU for which the read hit ratio is below the predefined threshold.

9. The system of claim 8, wherein:

read caching is enabled automatically over a longer time interval, regardless of read access distribution.

10. The system of claim 8, wherein:

when read caching is disabled for at least one LBU of the plurality of LBUs, determining that a read request cannot be satisfied from the write cache, without searching the write cache.

11. A non-transitory computer-usable medium embodying computer program code, the computer program code comprising computer executable instructions configured for:

performing a selective read caching function, the selective read caching function selectively enabling and disabling read caching for individual regions of a backstore depending on whether read caching has provided any recent benefit; and wherein while read caching is disabled, a distribution of read accesses to a logical backstore unit (LBU) is recorded over short time intervals, the short time intervals corresponding to a cache residency time value, the cache residency time value comprising a total cache size available for caching divided by a value comprising a read cache miss input/output operation rate for all participating cache multiplied by a ceiling value determined based upon at least an average transfer size, a cache segment size and a number of segments used for cache structures; and, read caching is enabled when one portion of the LBU has more read accesses than other LBUs.

12. The computer-usable medium of claim 11, wherein the computer executable instructions are further configured for:

dividing the backstore into a plurality of logical backstore units (LBUs), one of the plurality of logical backstore units comprising the logical backstore unit; and, selectively enabling and disabling read caching for each of the plurality of LBUs.

13. The computer-usable medium of claim 12, wherein:

a read hit ratio is recorded for each of the plurality of LBUs while a read cache is enabled; and, when the read hit ratio of each of the plurality of LBUs is below a predefined threshold, the read cache is disabled for each LBU for which the read hit ratio is below the predefined threshold.

14. The computer-usable medium of claim 13, wherein:

read caching is enabled automatically over a longer time interval, regardless of read access distribution.

15. The computer-usable medium of claim 13, wherein:

when read caching is disabled for at least one LBU of the plurality of LBUs, determining that a read request cannot be satisfied from the write cache, without searching the write cache.

* * * * *